United States Patent
Shah et al.

(10) Patent No.: US 11,521,507 B2
(45) Date of Patent: Dec. 6, 2022

(54) METHOD AND SYSTEM FOR SECURELY CONDUCTING A DIGITAL EXAMINATION

(71) Applicant: Tata Consultancy Services Limited, Mumbai (IN)

(72) Inventors: Viral Prakash Shah, Thane West (IN); Shobhit Shukla, Thane West (IN); Nihar Nilax Pandit, Thane West (IN); Sachin Ramdas Naik, Thane West (IN); Ankush Sharma, Thane West (IN)

(73) Assignee: Tata Consultancy Services Limited, Mumbai (IN)

( * ) Notice: Subject to any disclaimer, the term of this patent is extended or adjusted under 35 U.S.C. 154(b) by 296 days.

(21) Appl. No.: 17/084,930

(22) Filed: Oct. 30, 2020

(65) Prior Publication Data
US 2022/0139247 A1 May 5, 2022

(30) Foreign Application Priority Data
Oct. 30, 2020 (IN) .............................. 201921043994

(51) Int. Cl.
*G09B 7/00* (2006.01)
*G09B 7/06* (2006.01)
(Continued)

(52) U.S. Cl.
CPC ........... *G09B 7/066* (2013.01); *G06F 21/602* (2013.01); *G06F 21/606* (2013.01); *G06F 21/6209* (2013.01); *G09B 7/07* (2013.01)

(58) Field of Classification Search
CPC .. G09B 7/00; G09B 7/066; G09B 7/07; G06F 21/606
See application file for complete search history.

(56) References Cited

U.S. PATENT DOCUMENTS

| 8,374,540 | B2 * | 2/2013 | Kuntz | G09B 7/02 434/350 |
| 8,892,895 | B1 * | 11/2014 | Chesley | H04L 9/32 434/350 |

(Continued)

FOREIGN PATENT DOCUMENTS

| EP | 2 913 814 A1 | 2/2015 |
| IN | 2010MUM3218 A | 6/2013 |

OTHER PUBLICATIONS

Decision to Grant a European Patent Pursuant to Article 97(1) EPC dated Jun. 10, 2022, for EP Patent Application No. 20204527.4; 2 pages.

(Continued)

*Primary Examiner* — Peter R Egloff
(74) *Attorney, Agent, or Firm* — Finnegan, Henderson, Farabow, Garrett & Dunner, LLP (57) ABSTRACT

This disclosure relates generally to a method and system for securely conducting a digital examination. The present disclosure uploads the question papers, OMR bubble sheet and question paper's color information specific to an examination to a server wherein it is encrypted, zipped into a bundle wherein a unique key is generated. The encrypted bundle is downloaded, decrypted and unzipped on an electronic device using the user provided key wherein the invigilator adds the required details and encrypt again. The encrypted bundle is distributed to the candidate device through the paper distribution adhoc protocol. The candidate downloads, unzip and decrypts the encrypted bundle on the candidate device and provides the response to the question paper. The candidate's responses are evaluated, and result is declared locally if the candidate device is configured with a master key or uploaded to the server for further processing.

21 Claims, 6 Drawing Sheets

(51) Int. Cl.
  *G06F 21/60* (2013.01)
  *G06F 21/62* (2013.01)
  *G09B 7/07* (2006.01)

(56) References Cited

U.S. PATENT DOCUMENTS

| | | | |
|---|---|---|---|
| 9,105,194 B1* | 8/2015 | Kealey | G09B 7/00 |
| 2011/0111383 A1* | 5/2011 | Srinivasan | G09B 7/00 |
| | | | 434/322 |
| 2013/0137077 A1* | 5/2013 | Elangovan | G09B 7/00 |
| | | | 434/350 |
| 2013/0209982 A1 | 8/2013 | Rooks et al. | |
| 2013/0309644 A1* | 11/2013 | Shah | G06Q 90/00 |
| | | | 434/350 |
| 2017/0213471 A1 | 7/2017 | Breed | |
| 2020/0279223 A1* | 9/2020 | Sarab | G09B 7/00 |

OTHER PUBLICATIONS

Communication about intention to grant a European Patent received from the European Patent Office in EP Application No. 20204527.4; dated Jan. 19, 2022.

Extended European Search Report issued by the European Patent Office in counterpart European Patent Application No. 20204527.4 dated Mar. 22, 2021.

Author: A.R. Gadekar, M.V. Sarode and V.M. Thakare Title: Cloud based secure storage for online examination system Title of the item: International Journal of Engineering & Technology Date: 2018 vol. 7 (3.8) pp. 74-76 Publisher: Research Gate Link: https://www.researchgate.net/publication/326490551_Cloud_based_secure_storage_for_online_examination_stemtem/link/5c2d0b7792851c22a355592d/download.

* cited by examiner

METHOD AND SYSTEM FOR SECURELY CONDUCTING A DIGITAL EXAMINATION

PRIORITY CLAIM

This U.S. patent application claims priority under 35 U.S.C. § 119 to: India Application No. 201921043994, filed on Oct. 30, 2019. The entire contents of the aforementioned application are incorporated herein by reference.

TECHNICAL FIELD

This disclosure relates generally to the field of secure electronic educational assessment, and more particularly to a method and system for securely conducting a digital examination.

BACKGROUND

In developing countries like India, still majority of assessment is done on paper pen model or an offline mode of assessment. The computer-based assessment is as low as nearly 2%. Computer based assessments are always secure, fast and less effort consuming. Optical mark recognition (also called optical mark reading or OMR) is the process of capturing human-marked data from document forms such as surveys and tests. OMR is used to read questionnaires, multiple choice examination paper in the form of lines or shaded areas.

Currently the adaptation of computer-based assessment is very low. People are more familiar using Optical Mark Reader (OMR) sheet layout or look and feel, wherein they do not want to change. But the OMR approach requires a lot of preparation i.e. printing, forward logistics for question paper and the OMR bubble sheets, distribution to centers and candidates, reverse logistics and scanning of the answered the OMR bubble sheets to process them. The question paper printing and distribution to various centers and candidates involves huge forward and reverse logistics and is prone to get leaked wherein it is required to make sure that the correct question paper reaches the correct centers etc. Further the answered OMR bubble sheets for processing need reverse logistics and processing. Security of the answered OMR bubble sheets is necessary to avoid alteration of the OMR bubble sheets post assessment wherein all of these are costly and time consuming.

Currently the entire assessment conduction is manual wherein the question papers are prepared and stored online, then printed in sets and stored physically, requiring huge manpower, forward and reverse logistics. Further it requires huge efforts for invigilator to distribute question papers set wise, as there is no mapping involved in the assignment of question papers, question papers can be easily exchanged between one another and also there are also possibility to adjacent candidates may get same sets of question paper. In addition, the existing process is prone to leakage of question paper before the examination starts.

There are few prior arts which describe methods for securely distributing content such as question papers in examination. There are several loopholes during the pre-examination and the post examination phase which can influence the integrity and sureness of the whole examination process.

SUMMARY

Embodiments of the present disclosure present technological improvements as solutions to one or more of the above-mentioned technical problems recognized by the inventors in conventional systems. For example, in one embodiment, a method for securely conducting a digitally examination has been provided. The method comprises providing, via the one or more hardware processor, one or more question papers, an optical mark reader (OMR) bubble sheet and question paper's color information, specific to the digital examination; encrypting, via the one or more hardware processor, the one or more question papers with a first password; zipping, via the one or more hardware processor, the one or more encrypted question papers, the OMR bubble sheet and the question paper's color information into a bundle; encrypting, via the one or more hardware processor, the one or more question papers using a user provided key; downloading, via the one or more hardware processor, the encrypted bundle on one of an electronic device by an invigilator or on a candidate device by a candidate at an examination center, wherein the electronic device is being used by the invigilator and the candidate device is used by the candidate; decrypting and unzipping, via the one or more hardware processor, the encrypted bundle using the user provided key; adding, via the one or more hardware processor, details specific to the invigilator and the examination center on the electronic device by the invigilator, if the encrypted bundle is downloaded on the electronic device; zipping and encrypting, via the one or more hardware processor, the question paper, the OMR bubble sheet along with the invigilator details to regenerate the bundle for distribution to one or more candidate devices using a second password, if the encrypted bundle is downloaded on the electronic device; receiving, via the one or more hardware processor, the regenerated encrypted bundle by the one or more candidate devices; unzipping, via the one or more hardware processor, the encrypted bundle by one or more candidates on their respective candidate devices; decrypting, via the one or more hardware processor, the one or more question papers using the second password by the one or more candidates; selecting, via the one or more hardware processor, a question paper set by the candidate based on the configuration of a candidate device; providing, via the one or more hardware processor, answers in response to the selected question paper set by the candidate; and uploading, via the one or more hardware processor, the answers selected by the one or more candidates to the server for further processing and analytics.

In another aspect, there is provided a system for securely conducting a digital examination. The system comprises: a memory storing instructions; one or more communication interfaces; and one or more hardware processors coupled to the memory via the one or more communication interfaces, wherein the one or more hardware processors are configured by the instructions to: provide, via one or more hardware processor, one or more question papers, an optical mark reader (OMR) bubble sheet and question paper's color information, specific to the digital examination. The system further comprises encrypting, via the one or more hardware processor, the one or more question papers with a first password. Zipping, via the one or more hardware processor, the one or more encrypted question papers, the OMR bubble sheet and the question paper's color information into a bundle; encrypting, via the one or more hardware processor, the one or more question papers using a user provided key; downloading, via the one or more hardware processor, the encrypted bundle on one of an electronic device by an invigilator or on a candidate device by a candidate at an examination center, wherein the electronic device is being used by the invigilator and the candidate device is used by the candidate; decrypting and unzipping, via the one or more hardware processor, the encrypted bundle using the user provided key; adding, via the one or more hardware processor, details specific to the invigilator and the examination center on the electronic device by the invigilator, if the encrypted bundle is downloaded on the electronic device; zipping and encrypting, via the one or more hardware processor, the question paper, the OMR bubble sheet along with the invigilator details to regenerate the bundle for distribution to one or more candidate devices using a second password, if the encrypted bundle is downloaded on the electronic device; receiving, via the one or more hardware processor, the regenerated encrypted bundle by the one or more candidate devices; unzipping, via the one or more hardware processor, the encrypted bundle by the one or more candidates on their respective candidate devices; decrypting, via the one or more hardware processor, the one or more question papers using the second password by the one or more candidates; selecting, via the one or more hardware processor, a question paper set by the candidate based on the configuration of a candidate device; providing, via the one or more hardware processor, answers in response to the selected question paper set by the candidate; and uploading, via the one or more hardware processor, the answers selected by the one or more candidates to the server for further processing and analytics.

In yet another aspect, there are provided one or more non-transitory machine-readable information storage mediums comprising one or more instructions which when executed by one or more hardware processors cause providing, via the one or more hardware processor, one or more question papers, an optical mark reader (OMR) bubble sheet and question paper's color information, specific to the digital examination; encrypting, via the one or more hardware processor, the one or more question papers with a first password; zipping, via the one or more hardware processor, the one or more encrypted question papers, the OMR bubble sheet and the question paper's color information into a bundle; encrypting, via the one or more hardware processor, the one or more question papers using a user provided key; downloading, via the one or more hardware processor, the encrypted bundle on one of an electronic device by an invigilator or on a candidate device by a candidate at an examination center, wherein the electronic device is being used by the invigilator and the candidate device is used by the candidate; decrypting and unzipping, via the one or more hardware processor, the encrypted bundle using the user provided key; adding, via the one or more hardware processor, details specific to the invigilator and the examination center on the electronic device by the invigilator, if the encrypted bundle is downloaded on the electronic device; zipping and encrypting, via the one or more hardware processor, the question paper, the OMR bubble sheet along with the invigilator details to regenerate the bundle for distribution to one or more candidate devices using a second password, if the encrypted bundle is downloaded on the electronic device; receiving, via the one or more hardware processor, the regenerated encrypted bundle by the one or more candidate devices; unzipping, via the one or more hardware processor, the encrypted bundle by the one or more candidates on their respective candidate devices; decrypting, via the one or more hardware processor, the one or more question papers using the second password by the one or more candidates; selecting, via the one or more hardware processor, a question paper set by the candidate based on the configuration of a candidate device; providing, via the one or more hardware processor, answers in response to the selected question paper set by the candidate; and uploading, via the one or more hardware processor, the answers selected by the one or more candidates to the server for further processing and analytics.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a method and system for securely conducting a digital examination. The present disclosure creates a set of question papers securely and eliminates the process of printing the question papers. The content of the examination is in a digital form. Further, the completed answers in response to a plurality of question papers can be submitted, which are stored in an encrypted form and cannot be tampered, or the answer can be uploaded to the cloud servers eliminating the reverse logistics. In an embodiment, the answers are submitted in the form of the digital OMR. Thus, it ensures the secureness of answer sheets even after the examination is completed.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
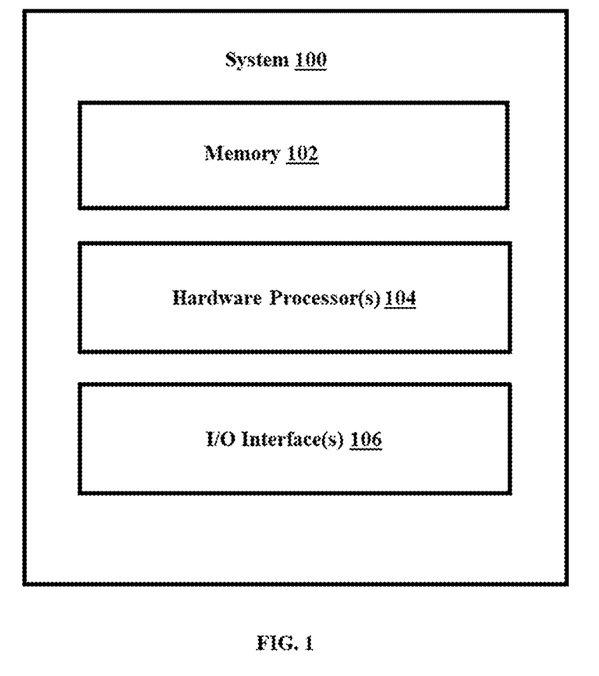
FIG. 1 illustrates a block diagram of an exemplary system for securely conducting a digital examination according to some embodiments of the present disclosure.

FIG. 1 illustrates a block diagram of an exemplary system for securely conducting a digital examination according to some embodiments of the present disclosure. In an embodiment, the system 100 includes one or more processors 104, communication interface device(s) or input/output (I/O)

interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 300 by the one or more processors 104.

Figure 2:
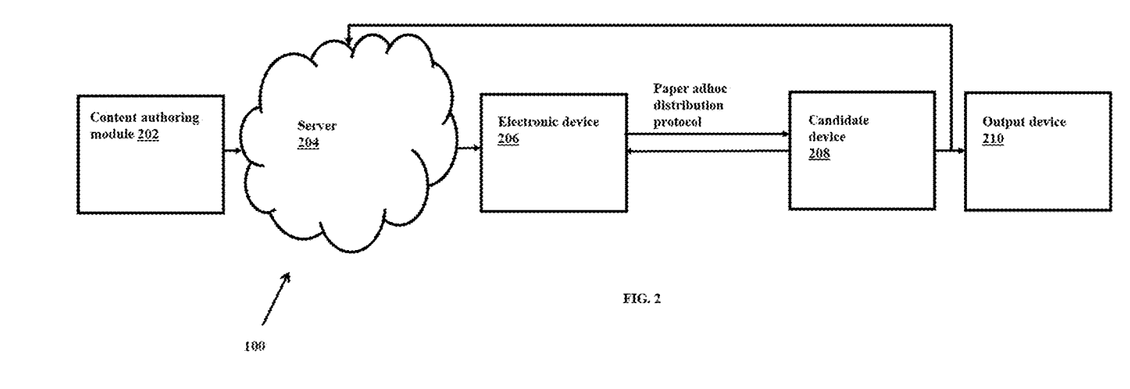
FIG. 2 is a functional block diagram of the system for securely conducting a digital examination according to some embodiments of the present disclosure.

FIG. 2 is a functional block diagram of the system for securely conducting a digital examination according to some embodiments of the present disclosure. The electronic device 206 can be a mobile phone, a laptop, a tablet, a computer or any other similar device. In an example, the electronic device 206 is a TCS iON PAPER electronic device. The electronic device 206 can be operated in two modes, an invigilator mode and a candidate mode. In the present disclosure, for the sake of clarity, when the electronic device is used by an invigilator it is called as the electronic device 206 to be used in the invigilator mode. When the electronic device is used by the candidates then it is called as a candidate device 208 to be used in the candidate mode. In an embodiment, the system 100 further includes a content authoring module 202, a server 204, an electronic device 206, a candidate device 208 and output device 210.

Figure 3A:
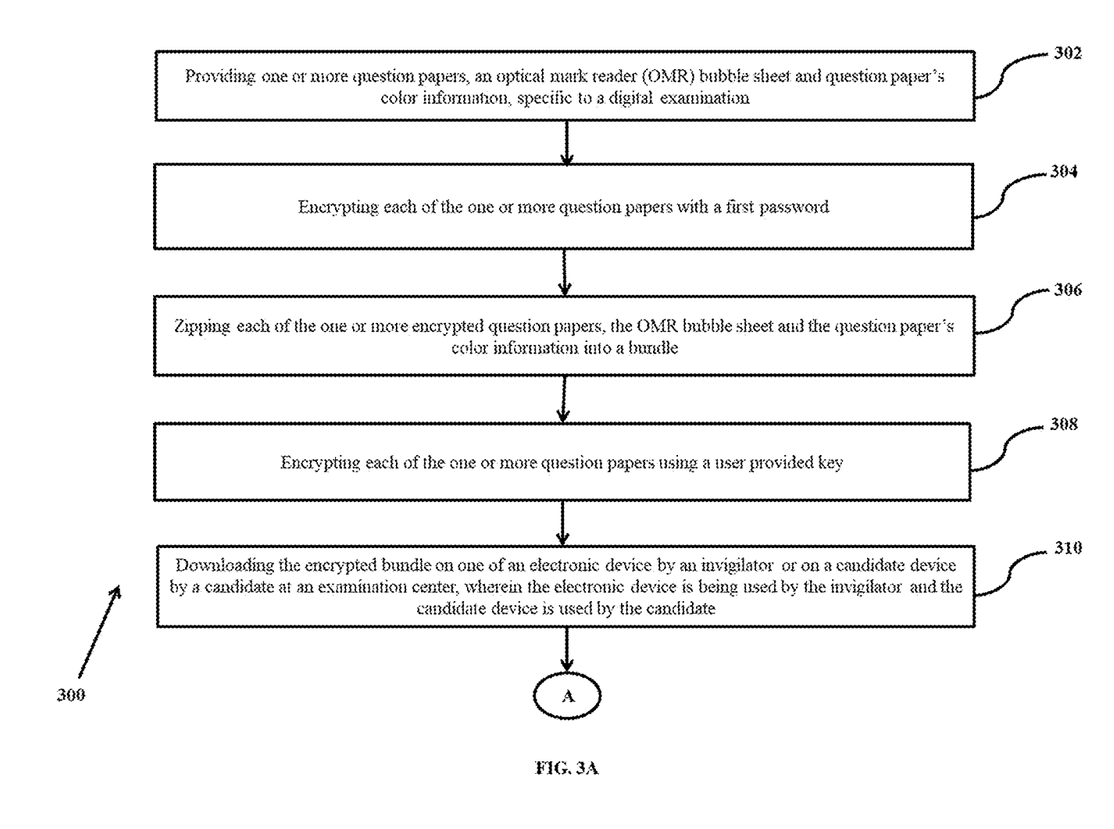
FIGS. 3A through 3C are flowcharts illustrating the steps involved in the method for securely conducting a digital examination, in accordance with some embodiments of the present disclosure.
Figure 3B:
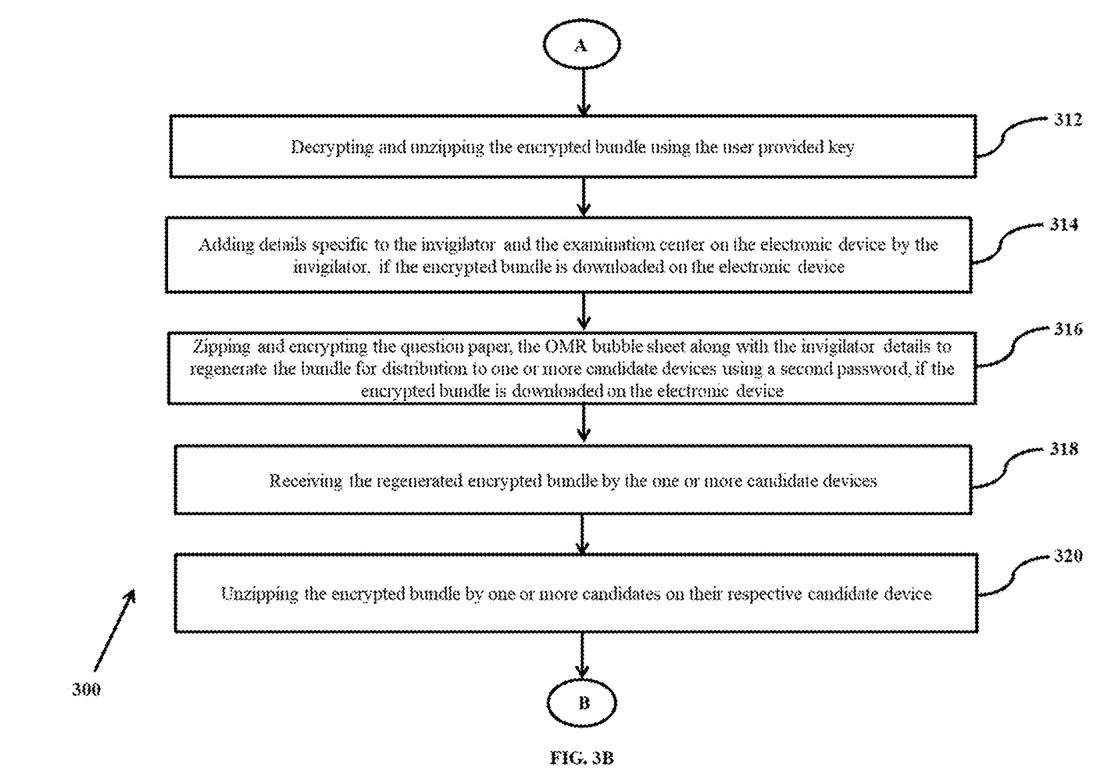
Figure 3C:
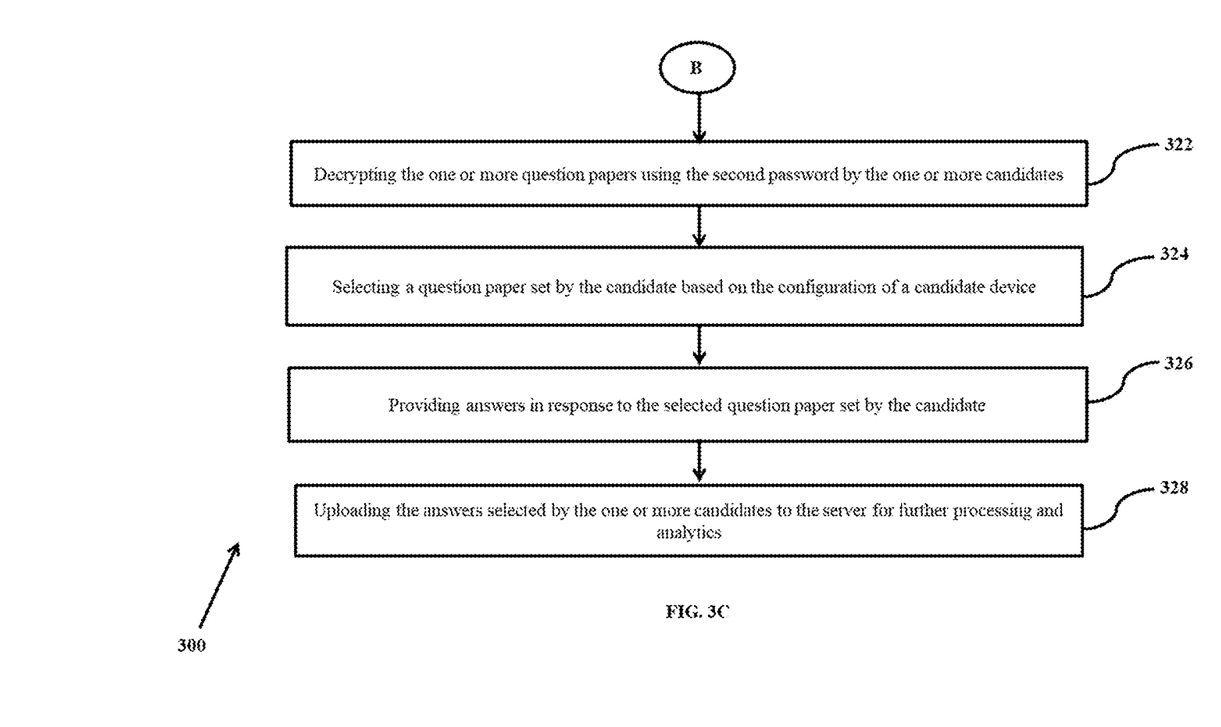

FIGS. 3A through 3C are flowcharts illustrating the steps involved in the method for securely conducting a digital examination, in accordance with some embodiments of the present disclosure. Steps of the method of FIGS. 3A through 3C shall be described in conjunction with the components of FIG. 1 and FIG. 2. At step 302, the one or more hardware processors 104 provide, one or more question papers, an optical mark reader (OMR) bubble sheet and question paper's color information, specific to an examination to a server. Referring to the FIG. 2, the content authoring module 202 of the system 100 uploads the set of question papers and the OMR bubble sheet with the scheduled examination time and question paper color information with password into the server 204. The present disclosure proposes to have the question paper and the OMR bubble sheet bundled together with an option to design the OMR layout which includes single column, double column, portrait layout OR landscape layout, numbers in the option or alphabets in the options, number of options so on and uploaded on the servers. The OMR bubble sheet includes the number of bubbles, the option inside the bubble is either numeric or alphabets, the number of answers, the number of rows of bubbles. Further, the entire communication between the electronic device 206 and the server 204 happen through a secure https protocol wherein the questions are created securely, and the set of question papers is synced securely only to the electronic device 206.

At step 304 of the present disclosure, the one or more hardware processors 104 encrypt, the one or more question papers with a first password generated by the server 204. The server 204 of the system 100 enables encrypting individual files with AES 256. Further all the encrypted individual files, the OMR bubble sheet and color metadata are zipped into a bundle and encrypted again with AES 256 using user provided key wherein a unique PIN is generated. The unique PIN is generated and assigned to the bundle containing the OMR bubble sheet and color metadata to verify the encrypted bundle. The unique pin is a combination of numbers or alphabets (if configured as alphanumeric) which is compared with all the existing pins to make sure it is unique if not then the process is repeated till unique pin is generated wherein the unique pin is generated by the server 204 on the cloud. At step 306 of the present disclosure, the one or more hardware processors 104 zip, the one or more encrypted question papers, the OMR bubble sheet and the question paper's color information into a bundle. At step 308 of the present disclosure, the one or more hardware processors 104 encrypt, the one or more question papers using a user provided key, wherein a unique PIN is generated for the zipped bundle by the server. At step 310 of the present disclosure, the one or more hardware processors 104 encrypt, download, via the one or more hardware processor, the encrypted bundle on an electronic device 206 by an invigilator at an examination center, wherein the electronic device 206 is being used by the invigilator. At step 312 of the present disclosure, the one or more hardware processors 104 decrypt and unzip, the encrypted bundle using the user provided key. The electronic device 206 of the system 100 is set to the invigilator mode by the invigilator to download, unzip and decrypt the encrypted bundle (containing individual question paper and the OMR bubble sheet) on the electronic device 206 at the scheduled time by the invigilator at the examination center. Further, the invigilator uses the electronic device 206 and the unique identifier PIN to download the encrypted bundle which contains individual question papers and the OMR bubble sheet. Once the encrypted bundle is downloaded, it is decrypted and unzipped using the user provided key.

At step 314 of the present disclosure, the one or more hardware processors 104 add, details specific to the invigilator and the examination center on the electronic device 206 by the invigilator. The invigilator adds details which includes invigilator details, test center, attendance information along with other details on the electronic device 206, wherein the files are zipped and encrypted again using a third password which is hardcoded in the electronic device 206, for distribution to the candidate device 208 through paper adhoc distribution protocol. At step 316 of the present disclosure, the one or more hardware processors 104, zip and encrypt, via the one or more hardware processor, the question paper, the OMR bubble sheet along with the invigilator details to regenerate the encrypted bundle for distribution to one or more candidate devices using a second password. The paper adhoc distribution protocol share/distribute the zipped and encrypted bundle containing the invigilator details and test center information added to the question paper files to candidate device 208. At step 318 of the present disclosure, the one or more hardware processors 104, receive, via the one or more hardware processor, the regenerated encrypted bundle by the one or more candidate devices. At step 320 of the present disclosure, the one or more hardware processors 104 unzip, the encrypted bundle by the one or more candidates on their respective candidate devices. The candidate device 208 unzips and decrypts the received encrypted bundle at zero click which includes the invigilator, test center, attendance information along with other details using a third password which is hardcoded in the candidate device 208. Further, the individual question papers are still encrypted with their own individual encryption key i.e. the second password. The decrypting the one or more question papers includes the second password which is published by the server to the electronic device within a predetermined time, wherein the invigilator shares the second password with the one or more candidates. At step 322 of the present disclosure, the one or more hardware processors 104 decrypt, via the one or more hardware processor, the one or more question papers using the second password by the one or more candidates.

At step 324 of the present disclosure, the one or more hardware processors 104 select, a question paper set by the candidate based on the configuration of a candidate device 208. The candidate selects the question paper/set which is set at the time of configuring the exam on the server. Based on the configuration set, a decision is taken on the assignment of the question paper/set for the candidate. The candidate device 208 can be configured to allow the candidate to choose from the list of sets or randomly open one of the question paper or depending on the present criteria input can be taken via barcode/qr code to select a question paper. The present disclosure provides color based set differentiation, i.e., the one or more question papers specific to different subjects can be encoded with different colors so that the invigilator is able to differentiate among the different subjects and make sure that adjacent candidates are not having same sets/subjects. Further the present disclosure implements automatic selection of a subject set i.e., in an examination with the one or more question papers specific to the same subject but different sets, the students are served different set of question papers, thus enabling randomizing of the one or more question papers. The present disclosure further enables candidate verification wherein, the candidate's device 208 generates a digital barcode of the unique identity code (for example, roll no), which can be verified by the invigilator's electronic device 206 thus identifying any impersonator.

At step 326 of the present disclosure, the one or more hardware processors 104 provide, answers in response to the selected question paper set by the candidate. The candidate enters his/her information and attempt the examination wherein this information will be matched with the attendance information, which was bundled by the invigilator, and hence impersonation can be prevented. Further at the start of examination, the candidate device 208 alerts in case the battery is not sufficient to conduct complete examination wherein alerts will be set when battery is left for the time interval of 30, 15 and 5 minutes. In addition, the candidate device 208 will not allow the exam to start if the battery is below a threshold, wherein the mentioned threshold is configurable.

In the present disclosure, the candidate device 108 can be configured to perform analytics at candidate device 108 level. Further, the candidate device 108 is able to analyze upon the answers correctness and the time period taken by the one or more candidates to answer the one or more questions and also the candidate's understanding of the related topic or the subject. The analytics can delve deeper, wherein if the candidate has answered the one or more questions correctly in the first attempt, or the candidate has changed the response from right to wrong or from wrong to right etc. Further, the present disclosure provides the information on the time period consumed by the candidate to answer the questions related to each topic, which is analyzed independently at the local device level and a report is shown to the candidate, or submitted to the cloud, to make the report available to the candidate at a later time period. The present disclosure further provides analytics at cloud server wherein the one or more candidates is compared with respect to the relevant topics i.e., the position of the candidate with respect to another candidate understanding of the relevant topic. Further, the proctoring data is captured and submitted to the cloud server wherein the proctoring data is then fed to an artificial intelligence algorithm to find out an activity log of the one or more candidates to find out the cheating/malpractice and so on. Further, at the cloud server the activity log of the students is matched to find out if there is any co-relation between the students answer logging time or the one or more candidates consistently answering a question in a similar way.

In another embodiment, the proctoring data is captured through camera of the candidate device 208, however, in this case, the candidate directly downloads the question paper from the server. The invigilator activities/functionalities in the examination center are bypassed or performed by the candidate himself/herself, and the candidate's device 208 directly download from the cloud server along with the proctoring information. However, the invigilation is done remotely, and incase if the candidate is not attending the exam from a center, then the devices which includes camera, micro phone etc. along with the artificial intelligence on cloud is used to identify any malpractice/impersonation. Further, the proctoring can be implemented in two ways, which includes—
  The candidate device 208 is online during the examination, then the proctoring is done/captured in real time wherein the proctoring is streamed live.
  The candidate device 208 is offline and in this case the candidate device 208 captures the proctoring data according to the proctoring information which was downloaded during the assessment bundle download. Further, the proctoring data is uploaded along with the candidate's response which is processed further with the help of AI (artificial intelligence) algorithms as mentioned in the above point.

According to an embodiment of the disclosure, the one or more question papers is accessible post examination through an application wherein in case electronic device 206 goes off or restart, system opens the same examination paper. Further, the electronic device 206 render the question paper and the OMR bubble sheet wherein using the color metadata the question paper header is colored accordingly which can be used by the invigilator to distinguish different subject/set of a question paper in order to avoid cheating during the exam for the candidates sitting adjacently. According to an embodiment of the disclosure, the candidate's record attendance is verified by scanning the QR code/bar code which is generated with the credentials/information entered by the candidate using the candidate's device 208. The invigilator verifies candidate's record attendance using the QR code/bar code generated with the credentials/information (for example, roll number) entered by the candidate on the candidate's device 208. The invigilator scans and verify with the information he/she has with him/her about the candidate using the information which includes candidate's photo, candidates biometric and alike. At step 328 of the present disclosure, the one or more hardware processors 104 upload, the answers selected by the one or more candidates to the server for further processing and analytics.

Figure 4:
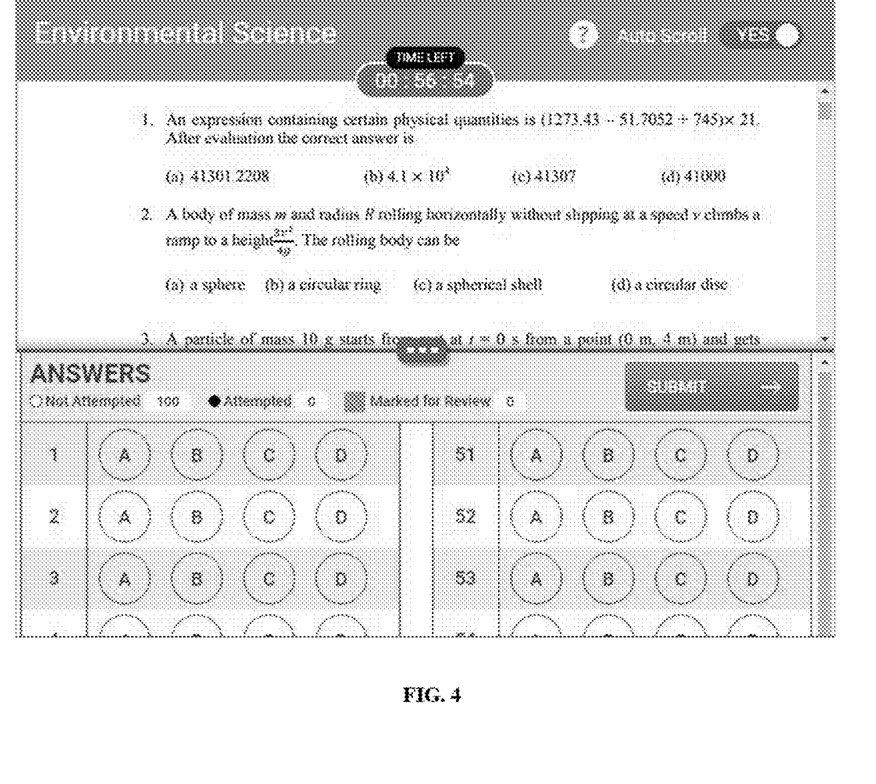
FIG. 4 is an example of a sample question paper and an OMR bubble sheet to be utilized by the method and system for securely conducting a digital examination, in accordance with some embodiments of the present disclosure.

FIG. 4 is an example of a sample question paper and an OMR bubble sheet to be utilized by the method and system for securely conducting a digital examination, in accordance with some embodiments of the present disclosure. Referring to FIG. 4, the candidate can select the answers simply by touching any portion of the bubble wherein the entire bubble is darkened and indicate it as selected. Further the answers can be selected by long pressing on the bubble which is done to avoid accidentally selecting/changing of the answers and the candidate can also alter an already marked bubble by simply changing the selection. Option can be provided to the candidate to mark an answer for review wherein counts of pending, attempted, marked for review and many other indicators can be provided for easy and quick evaluation of the status. Further a timer can display the remaining time or the current time. Automatic scrolling of the OMR bubble sheet in sync with the question paper can be provided for ease of use. Further, if the answer keys are provided the answers entered by the candidate can be evaluated immediately and the result can be published. Once all the questions are answered or the time is exhausted, the answers can be submitted and these are stored in the device with AES encryption till the device is connected to the internet, after which the answers will be synced, either manually or automatically with the servers using the secure https protocol.

In reference to the FIG. 2, the steps/components for implementing the technical flow mentioned above are described below. In an embodiment, the present disclosure includes a content authoring engine 202 where the questions are created securely inside the campus. Further question papers are encrypted with AES 256 Bit Encryption by author provided key wherein automated and accurate distribution of question paper at centers based on the examination schedule takes place. Paper sharing takes place and question paper is downloaded at the center through the electronic device 206. Further there is no need of paper, logistics, printing, and there is no leakage of question papers prior to the examination and question paper delivery delays. The question papers are downloaded on the server 204 and then distributed through the electronic device 206 without internet. Further, every candidate carries the electronic device 206 for examination or provided by the examination center. The right set of question paper with randomization gets synced onto the electronic device 206 automatically on time and examination does not start until the examination time. The software features of the present disclosure include android operating system. Further, the question paper is synced securely only to the electronic device 206 wherein the question paper cannot be taken out and the password is visible only 10 minutes before examination. Further at the start of examination, the candidate device 208 alerts in case the battery is not sufficient to conduct complete examination wherein alerts are set when battery is left for the time interval of 30, 15 and 5 minutes. All the question papers are accessible post examination through application wherein in case device goes off or restart, system opens the same examination paper and there is no dependency on invigilator for set randomization. Further, the hardware features of the present disclosure include screen size of 9 inches to A4, limited touch screen, grey scale display for better visibility in reading. Further, a navigation options includes next, previous, first and last, zoom in and zoom out, embedded camera, Bluetooth and Wi-Fi, good battery backup and gang charger, light weight, after sales support and easy to use.

The present disclosure has the advantage of digital rendering on the candidate end wherein the question paper can be kept secure till the point of consumption. Further, there is no forward or reverse logistics involved and the OMR bubble sheet cannot be altered post the assessment is over. The present disclosure allows user to touch a single place on the bubble and mark the entire bubble, without the user worrying about improperly marking of the bubble. Further, validations can be placed, wherein only one answer can be marked for an answer, thus if the user selects multiple answers then the user is alerted and the validations can be put in place to allow an user to give freedom to change an answer any number of times, or only 'n' number of times or no change at all. Further, the question paper and the digital OMR form, fonts, color etc., can be changed quickly using the digital medium wherein the digital markings can be translated directly into any format so that the bubble marking can be compared against the answer keys to score the answer sheet digitally. The digitally marked the OMR bubble sheet can be further evaluated on the device itself if the answer key is available and the score can be displayed to the candidate immediately on completing the examination. Further, the user can be given various filters including questions attempted, questions not attempted, or questions marked for review so that he/she can review it later and the results can be declared instantaneously.

Hence the present disclosure proposes to upload the question paper and configuration for rendering the OMR bubble sheet in secure server, which is encrypted using AES 256 with the key which is user provided as password. Further, access to this question paper is restricted to everyone before the configured examination time wherein the question paper can be downloaded on an electronic device 206 just before the scheduled examination time and the device decrypts the question paper if a correct password is provided. The question paper can then be further distributed to other electronic device 206 using the paper sharing wherein the question paper also contains the information about the OMR bubble sheet using which the OMR bubble sheet is rendered on the electronic device 206, and the user can then see the questions from the question paper where he/she can select his/her answer by selecting the bubbles on the OMR bubble sheet. Further the OMR bubble sheet can be processed on the electronic device 206 to evaluate the answers and compute the score of the candidate or can be uploaded to the servers for further processing.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for securely performing a digital examination, the method comprising:
providing, via one or more hardware processor, one or more question papers, an optical mark reader (OMR) bubble sheet and question paper's color information, specific to the digital examination;
encrypting, via the one or more hardware processor, the one or more question papers with a first password;
zipping, via the one or more hardware processor, the one or more encrypted question papers, the OMR bubble sheet and the question paper's color information into a zipped bundle;
encrypting, via the one or more hardware processor, the zipped bundle using a user provided key;
downloading, via the one or more hardware processor, the encrypted zipped bundle on one of an electronic device by an invigilator or on a candidate device by a candidate at an examination center, wherein the electronic device is being used by the invigilator and the candidate device is used by the candidate;
decrypting and unzipping, via the one or more hardware processor, the encrypted zipped bundle using the user provided key;
adding, via the one or more hardware processor, details specific to the invigilator and the examination center on the electronic device by the invigilator, if the encrypted zipped bundle is downloaded on the electronic device;
zipping and encrypting, via the one or more hardware processor, the question paper, the OMR bubble sheet along with the invigilator details to regenerate the bundle for distribution to one or more candidate devices using a second password, if the encrypted zipped bundle is downloaded on the electronic device;
receiving, via the one or more hardware processor, the regenerated encrypted bundle by the one or more candidate devices;
unzipping, via the one or more hardware processor, the regenerated encrypted bundle by one or more candidates on their respective candidate devices;
decrypting, via the one or more hardware processor, the one or more question papers using the second password by the one or more candidates;
selecting, via the one or more hardware processor, a question paper set by the candidate based on the configuration of the candidate device;
providing, via the one or more hardware processor, answers in response to the selected question paper set by the candidate, wherein an option is provided to the candidate to mark an answer for review;
uploading, via the one or more hardware processor, the answers selected by the one or more candidates to the server for further processing and analytics;
determining, via the one or more hardware processor, an activity log, wherein the activity log comprising one or more activities exhibited by the one or more candidates, the activity log is validated to determine at least one of:
(i) co-relation between the one or more candidates answer logging time; and
(ii) the one or more candidates consistently answering the question in similar way; and
evaluating and declaring, via the one or more hardware processor, result of the examination locally if the candidate device is configured with a master answer key, provided the master answer key is bundled with the one or more question papers.

2. The processor implemented method of claim 1, further comprising invigilating remotely if the candidate is not attending the exam from the examination center and the encrypted bundle is downloaded on the candidate device.

3. The processor implemented method of claim 1, further comprising generating the first password by a server.

4. The processor implemented method of claim 1, further comprising analyzing the answers correctness and a time period taken by the one or more candidates to answer the one or more questions.

5. The processor implemented method of claim 1, further comprising determining a number of attempts made by the candidate to answer each question.

6. The processor implemented method of claim 1, further comprising capturing a proctoring data, wherein the proctoring data is fed to an artificial intelligence algorithm to determine malpractice performed by the one or more candidates and, further comprising capturing the proctoring data through the camera of the candidate device.

7. The processor implemented method of claim 1, wherein the distribution of the one or more question papers to the one or more candidates is done through a paper adhoc distribution protocol.

8. The processor implemented method of claim 1, further comprising validating the required information entered by the candidate with the attendance bundled by the invigilator, and, wherein the step of verifying, the candidate's record attendance is performed by scanning the QR code/bar code which is generated using the information entered by the candidate using the candidate's device.

9. The processor implemented method of claim 1, wherein the step of decrypting the one or more question papers includes the second password which is published by the server to the electronic device within a predetermined time, wherein the invigilator shares the second password with the one or more candidates.

10. The processor implemented method of claim 1, further comprising sending an alert by the candidate device, if the battery is below a threshold to conduct complete examination.

11. A system, comprising:
a memory storing instructions;
one or more communication interfaces; and
one or more hardware processors coupled to the memory via the one or more communication interfaces (106), wherein the one or more hardware processors are configured by the instructions to:
provide, one or more question papers, an optical mark reader (OMR) bubble sheet and question paper's color information, specific to a digital examination;
encrypt, the one or more question papers with a first password;
zip, the one or more encrypted question papers, the OMR bubble sheet and the question paper's color information into a zipped bundle;
encrypt, the zipped bundle using a user provided key;
download, the encrypted zipped bundle on one of an electronic device by an invigilator or on a candidate device by a candidate at an examination center, wherein the electronic device is being used by the invigilator and the candidate device is used by the candidate;
decrypt and unzip, the encrypted zipped bundle using the user provided key;
add, details specific to the invigilator and the examination center on the electronic device by the invigilator, if the encrypted zipped bundle is downloaded on the electronic device;
zip and encrypt, the question paper, the OMR bubble sheet along with the invigilator details to regenerate the bundle for distribution to one or more candidate devices using a second password, if the encrypted zipped bundle is downloaded on the electronic device;
receive, the regenerated encrypted bundle by the one or more candidate devices;
unzip, the regenerated encrypted bundle by one or more candidates on their respective candidate devices;
decrypt, the one or more question papers using the second password by the one or more candidates;
select, a question paper set by the candidate based on the configuration of the candidate device;
provide, answers in response to the selected question paper set by the candidate, wherein an option is provided to the candidate to mark an answer for review;
upload, the answers selected by the one or more candidates to the server for further processing and analytics;
determine an activity log, wherein the activity log comprising one or more activities exhibited by the one or more candidates, the activity log is validated to determine at least one of:
(i) co-relation between the one or more candidates answer logging time; and
(ii) the one or more candidates consistently answering the question in similar way; and
evaluate and declare, result of the examination locally if the candidate device is configured with a master answer key, provided the master answer key is bundled with the one or more question papers.

12. The system of claim 11, wherein the one or more hardware processors are further configured to invigilate remotely if the candidate is not attending the exam from the examination center and the encrypted bundle is downloaded on the candidate device.

13. The system of claim 11, wherein the one or more hardware processors are further configured to generate a first password by a server.

14. The system of claim 11, wherein the one or more hardware processors are further configured to analyze the answers correctness and a time period taken by the one or more candidates to answer the one or more questions.

15. The system of claim 11, wherein the one or more hardware processors are further configured to determine a number of attempts made by the candidate to answer each question.

16. The system of claim 11, wherein the one or more hardware processors are further configured to capture a proctoring data and submitting to the server, wherein the proctoring data is fed to an artificial intelligence algorithm to determine malpractice performed by the one or more candidates and, further configured to capture the proctoring data through the camera of the candidate device.

17. The system of claim 11, wherein the distribution of the one or more question papers to the one or more candidates is done through paper adhoc distribution protocol.

18. The system of claim 11, wherein the one or more hardware processors are further configured to validate the required information entered by the candidate with the attendance bundled by the invigilator and, wherein step of verifying, the candidate's record attendance is performed by scanning the QR code/bar code which is generated using the information entered by the candidate using the candidate's device.

19. The system of claim 11, wherein the one or more hardware processors are further configured to perform the step of decrypting the one or more question papers includes the second password which is published by the server to the electronic device within a predetermined time, wherein the invigilator shares the second password with the one or more candidates.

20. The system of claim 11, wherein the one or more hardware processors are further configured to send an alert by the candidate device if the battery is not sufficient or below certain threshold to conduct complete examination.

21. One or more non-transitory machine readable information storage mediums comprising one or more instructions which when executed by one or more hardware processors cause:
providing, one or more question papers, an optical mark reader (OMR) bubble sheet and question paper's color information, specific to the digital examination;
encrypting, via the one or more hardware processor, the one or more question papers with a first password;
zipping, the one or more encrypted question papers, the OMR bubble sheet and the question paper's color information into a zipped bundle;
encrypting, the zipped bundle using a user provided key;
downloading, the encrypted zipped bundle on one of an electronic device by an invigilator or on a candidate device by a candidate at an examination center, wherein the electronic device is being used by the invigilator and the candidate device is used by the candidate;
decrypting and unzipping, the encrypted zipped bundle using the user provided key;
adding, details specific to the invigilator and the examination center on the electronic device by the invigilator, if the encrypted zipped bundle is downloaded on the electronic device;
zipping and encrypting, the question paper, the OMR bubble sheet along with the invigilator details to regenerate the bundle for distribution to one or more candidate devices using a second password, if the encrypted zipped bundle is downloaded on the electronic device;
receiving, the regenerated encrypted bundle by the one or more candidate devices;
unzipping, the regenerated encrypted bundle by one or more candidates on their respective candidate devices;
decrypting, the one or more question papers using the second password by the one or more candidates;
selecting, a question paper set by the candidate based on the configuration of the candidate device;
providing, answers in response to the selected question paper set by the candidate, wherein an option is provided to the candidate to mark an answer for review;
uploading, the answers selected by the one or more candidates to the server for further processing and analytics;
determining, via the one or more hardware processor, an activity log, wherein the activity log comprising one or more activities exhibited by the one or more candidates, the activity log is validated to determine at least one of:
(i) co-relation between the one or more candidates answer logging time; and
(ii) the one or more candidates consistently answering the question in similar way; and
evaluating and declaring, via the one or more hardware processor, result of the examination locally if the candidate device is configured with a master answer key, provided the master answer key is bundled with the one or more question papers.

* * * * *